US008407876B2

(12) United States Patent
Fischer

(10) Patent No.: US 8,407,876 B2
(45) Date of Patent: Apr. 2, 2013

(54) MODERNIZATION METHOD FOR ELEVATOR INSTALLATIONS

(75) Inventor: Daniel Fischer, Aigle (CH)

(73) Assignee: Inventio AG, Hergiswil NW (CH)

( * ) Notice: Subject to any disclaimer, the term of this patent is extended or adjusted under 35 U.S.C. 154(b) by 109 days.

(21) Appl. No.: 13/127,895

(22) PCT Filed: Oct. 15, 2009

(86) PCT No.: PCT/EP2009/063507

§ 371 (c)(1),
(2), (4) Date: May 5, 2011

(87) PCT Pub. No.: WO2010/052109

PCT Pub. Date: May 14, 2010

(65) Prior Publication Data

US 2011/0209318 A1 Sep. 1, 2011

(30) Foreign Application Priority Data

Nov. 5, 2008 (EP) .................................... 08168324

(51) Int. Cl.

*B23P 6/00* (2006.01)
*B23P 11/00* (2006.01)
*B66B 9/04* (2006.01)

(52) U.S. Cl. ................. 29/401.1; 29/402.03; 29/402.08; 187/272; 187/287

(58) Field of Classification Search ................. 29/892.1, 29/401.1, 402.03, 402.08; 187/272, 273, 187/274, 275, 285, 286, 287
See application file for complete search history.

(56) References Cited

U.S. PATENT DOCUMENTS

2003/0106747 A1* 6/2003 Sasaki .......................... 187/373
2006/0175140 A1 8/2006 Kolb et al.

FOREIGN PATENT DOCUMENTS

DE 10154171 A1 5/2003
EP 0648703 A1 4/1995
EP 0953537 A2 11/1999
EP 1561720 A2 8/2005

* cited by examiner

*Primary Examiner* — Jermie Cozart
(74) *Attorney, Agent, or Firm* — Fraser Clemens Martin & Miller LLC; William J. Clemens

(57) ABSTRACT

A modernization method for converting a hydraulically actuated elevator system into an elevator system driven by a drive machine having a drive sheave makes it possible to convert and retain some essential elements of the existing elevator system. Car support rollers are arranged beneath an underside of an elevator car in the area of points of the underside of the elevator car located opposite each other and are connected to the elevator car. Furthermore, a support is guided along the underside of the elevator car and about the car support rollers. The support is also guided about the drive sheave so that the support can be driven by the drive sheave of the drive machine in order to raise and lower the elevator car.

19 Claims, 4 Drawing Sheets

MODERNIZATION METHOD FOR ELEVATOR INSTALLATIONS

FIELD OF THE INVENTION

The invention relates to a modernization method for conversion of a hydraulically actuated elevator installation into an elevator installation, which is driven by a drive machine with a drive pulley, and to a modernized elevator installation, which is produced by such a method. In particular, the invention relates to the field of modernization of hydraulically actuated elevator installations which for reasons of environmental protection are not to continue in operation and are to be replaced by drive pulley elevators.

BACKGROUND OF THE INVENTION

A method of converting a hydraulic elevator, which is arranged in an elevator shaft, into a drive cable-pulley elevator is known from DE 101 54 171 A1. The known method for modernization relates to hydraulic elevator installations which were, in particular, erected in large numbers in the 1960s and 1970s, since a reliable and relatively economic possibility was made available by these for equipping buildings—even those with just a few floors—with elevator installations in a relatively problem-free manner. After twenty or more year's of operating time a fundamental revision or modernization arises with such hydraulic installations. However, hydraulic elevators have a relatively high energy consumption and need for maintenance and are always susceptible to the risk of escape of hydraulic fluid, which must not pass into the groundwater. Accordingly, for reasons of environmental protection it can be feasible to completely remove the hydraulic elevator and install a drive pulley elevator in place thereof.

The modernization method known from DE 101 54 171 A1 enables conversion of an existing hydraulically actuated elevator installation so that components, particularly the elevator car, remain substantially unchanged and thus the conversion costs can be reduced. In this connection a deflecting cable pulley is installed at the elevator car. In addition, a drive pulley drive unit is arranged in the space available above the car. Moreover, a counterweight is installed. The conveying cables then run from a fixed point at the top in the elevator shaft downwardly to the counterweight, from this back upwardly to the drive pulley drive unit with the drive pulley, around the drive pulley and down again to the deflecting cable pulley at the elevator car, around the deflecting cable pulley of the elevator car and upwardly again to a fixed point at the top in the elevator shaft.

The modernization method known from DE 101 54 171 A1 has the disadvantage that the possibility of use is limited. In particular, the known modernization method is suitable only for so-termed 'rucksack' elevators, i.e. for elevator cars having a guide system designed for the purpose of being able to absorb tipping moments arising as a consequence of eccentric suspension. A significant disadvantage of the known modernization method also resides in the fact that the drive arrangement thereof requires a substantial spacing between the ceiling of the elevator shaft and the roof of the elevator car. This results from the fact that between the ceiling of the elevator shaft and the roof of the elevator car a deflecting roller, the drive unit and also the support construction of the drive unit have to be arranged one above the other at the elevator car.

SUMMARY OF THE INVENTION

An object of the invention is to create a modernization method for conversion of a hydraulically actuated elevator installation, which is usable as universally as possible and in a manner which is as space-saving as possible, and of indicating an elevator installation produced in accordance with such a modernization method.

It is to be noted that a support means can have, apart from the function of supporting the elevator car, also the function of transmitting the force or the torque of the drive machine to the elevator car so as to actuate the elevator car. By actuation of the elevator car there is to be understood, in particular, raising or lowering of the elevator car. In that case, the elevator car can be guided by one or more guide rails. As elevator car there is to be understood in the following the original elevator car which was already present in the hydraulic elevator installation to be modernized.

In advantageous manner the car support rollers are arranged in the region of mutually opposite points of the underside of the elevator car and connected with the elevator car, wherein the car support rollers in that case lie substantially below two mutually opposite walls of the elevator car and project somewhat beyond these. This is achieved in that the car support rollers project laterally partly beyond the underside of the elevator car. The support means can thereby run past the elevator car, wherein the space required is optimized.

Moreover, it is advantageous that the support means is fixed by its first end in the region of the drive unit and is led around the support roller, which lies below the fixing point, of the counterweight, is subsequently led around the drive pulley of the drive unit disposed at the top, led downwardly to the first car support roller and deflected by 90° around this, led horizontally below the elevator car along the underside and deflected upwardly at the second car support roller through 90° and finally led to a further fixing point present in the upper region of the elevator shaft. This method step, which can also be carried out in reverse sequence, has the advantage that a secure mounting is made possible, wherein the space required is optimized with respect to the previously existing hydraulic drive. The modernization method is thereby suitable for a large number of hydraulically actuated elevator installations of different design.

In advantageous manner a drive platform is mounted on the elevator car below this, wherein the drive platform has the car support rollers or the car support rollers are connected with the elevator car by means of the drive platform. The drive platform enables reliable mounting of the existing elevator car, wherein modifications of the existing elevator car are not required or required to only a small extent. The drive platform can in that case consist substantially of a continuous beam in which the car support rollers are incorporated or are attached thereto. The continuous beam is preferably substantially narrower than a depth of the elevator car. The beam is flange-mounted from below on the existing elevator car, wherein it replaces an equivalent beam of the former elevator, by way of which the elevator car was supported on the piston rod of the hydraulic cylinder. The stability of shape of the existing elevator car is in that case utilized in advantageous manner, particularly if the entire structure is guided at elevator guide rails by way of guide shoes mounted on the elevator car and is stabilized in three-dimensions. The lower guide shoes can, however, also be present at the newly mounted drive platform so as to achieve a greater degree of spacing between the upper and lower guide shoes and thus improved travel characteristics of the elevator car.

In addition, the drive platform can advantageously provide different functions which are not realized or only partly realized in the existing hydraulic elevator installation. For example, the drive platform can comprise a load measuring device by way of which the elevator car is supported on the drive platform so that the instantaneous load and thus the loading of the elevator car can be ascertained. In addition, the drive platform can comprise a safety device which is designed as catch equipment (safety brake device) and/or operating brake device. Thus, further functions which, in particular, improve the safety of the elevator installation can be integrated in the elevator installation during modernization.

Moreover, it is advantageous if a drive platform is provided which comprises a main beam with two end parts displaceable and lockable relative to this main beam, wherein the car support rollers are mounted in or at these end parts. This enables adaptation to elevator cars of different design or having different widths as also to differences in the arrangement of the support means, whereby a greater range of use results. Such an adjustability, which serves for adaptation to different car widths, etc., of the drive platform can be of advantage, but is not absolutely necessary.

Moreover, it is possible for the drive platform to be of multi-part construction, wherein a first part for the first car support roller is provided at the outset separately from a second part for the second car support roller. The two parts can be connected by means of a connecting part of the drive platform.

DESCRIPTION OF THE DRAWINGS

Preferred exemplifying embodiments of the invention are explained in more detail in the following description on the basis of the accompanying drawings, in which corresponding elements are provided with corresponding reference numerals and in which.

DETAILED DESCRIPTION OF THE INVENTION

Figure 1:
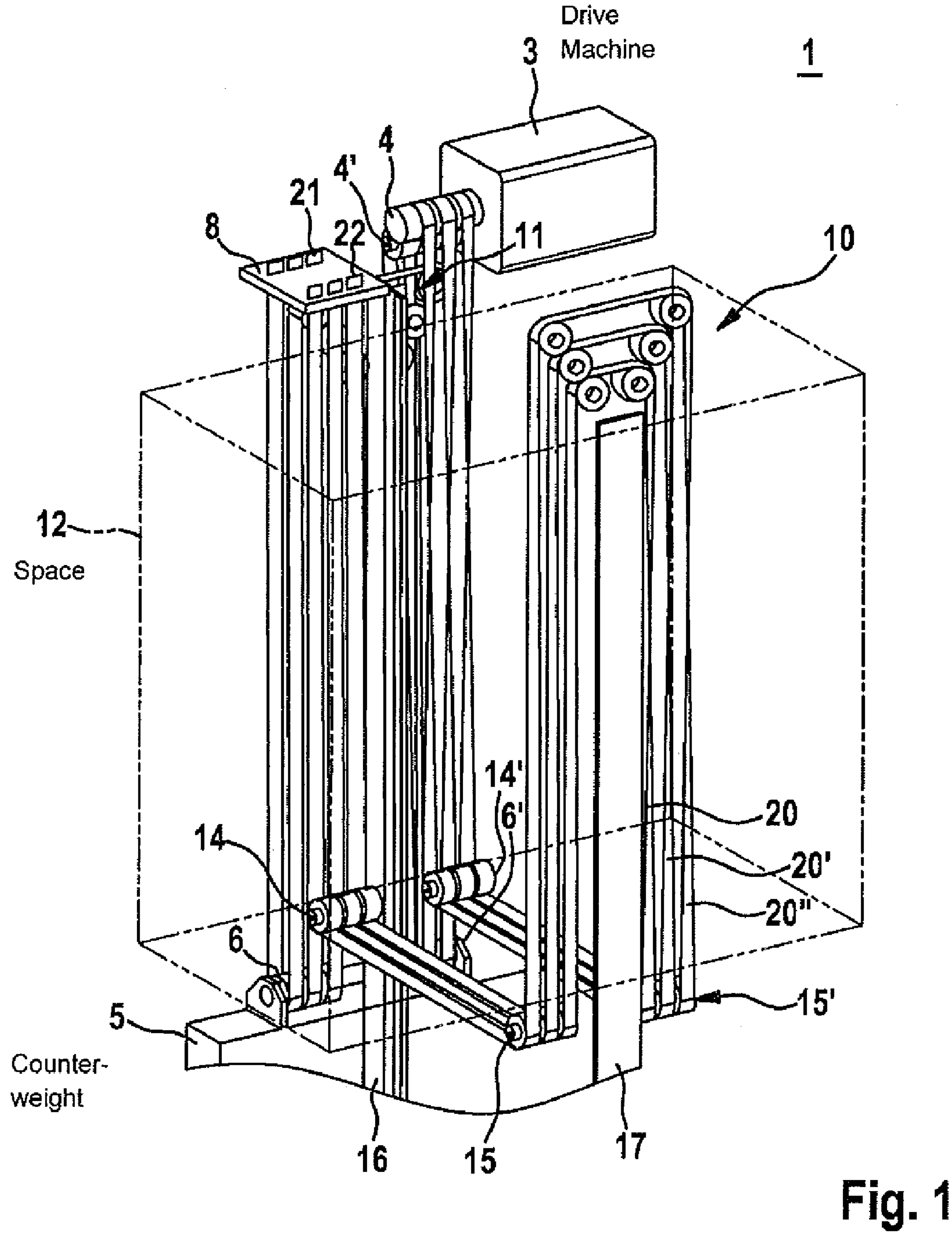
FIG. 1 shows a schematic, perspective view of an elevator installation, which has been converted by a modernization method in correspondence with a first exemplifying embodiment of the invention.

FIG. 1 shows a first possible form of embodiment of an elevator installation 1 in a schematic illustration, which has been converted by a modernization method in correspondence with a first exemplifying embodiment of the invention. The modernization method in that case starts from a hydraulically actuated elevator installation. This hydraulically actuated elevator installation is converted by means of the modernization method into an elevator installation 1 driven by a drive machine with a drive pulley. Components, which are no longer needed, of the existing hydraulically actuated elevator installation can be removed within the scope of the conversion. Individual components, even if these are no longer used, can in a given case also remain in the elevator installation. However, essential elements of the hydraulically actuated elevator installation are taken over in the modernization method of the invention, so that the costs of the modernization are limited. Essentially changed is the drive system, wherein the new drive pulley drive requires, not only for the saving of energy, the installing of a counterweight with associated counterweight guide. By contrast to the hydraulic direct drive, in this drive system a safety brake device (catch equipment) is mounted at the elevator car, wherein the safety brake device is activatable by a speed detection system similarly to be additionally installed. The elevator car with car door and door drive, the car guide system, the shaft doors, the position detecting equipment and at a least a part of the elevator control remain. The thus-achieved reduction in modernization time and the avoidance of costly individual adaptations then make possible a reduction in costs and a shortening of the interruption of operation.

Some parts of the modernized elevator installation are schematically illustrated in FIG. 1. A drive machine 3 with a drive pulley 4 is arranged in the upper region of an elevator shaft 2 (FIG. 3). A counterweight 5 with a support roller 6 is arranged below the drive machine 3. In addition, a first fastening device 8 is mounted on a shaft wall 7 (FIG. 3) of the elevator shaft. Moreover, a deflecting device 10 is mounted on a shaft wall 7 (FIG. 3) of the elevator shaft 2 or on an elevator car guide rail and is arranged approximately at the height of the drive machine 3 with the drive pulley 4. A further deflecting device 11 is mounted on the shaft wall 7 (FIG. 3). This deflecting device 11 is arranged somewhat below the drive machine 3. In addition, illustrated in FIG. 1 is the space 12 which is needed by an elevator car 13 (FIG. 2) for its travel through the elevator shaft 2. The elevator car 13 is, for simplification of the illustration, not shown in FIG. 1. Furthermore, first car support rollers 14, 14' and second car support rollers 15, 15' are provided and are connected with the elevator car 13, as is described in further detail by way of FIG. 2.

The illustrated elevator installation has a 4:1 suspension, i.e. a support means arrangement in which the support means has at the drive pulley 4 a speed corresponding with four times the speed of the elevator car 13. The force transmission required between the drive pulley 4 and the support means is correspondingly reduced.

In addition, elevator car guide rails 16, 17 are arranged in the elevator shaft 2, wherein the elevator car guide rail 16 is arranged in the region of the shaft wall 7 and connected therewith in suitable manner, whereas the elevator car guide rail 17 is arranged in the region of the shaft wall 9 and connected therewith in suitable manner. The elevator car guide rail 17 is in that case provided below the deflecting device 10. However, the deflecting device 11 is arranged near the elevator car guide rail 16, since the deflecting device 11 is arranged somewhat deeper than the deflecting device 10. The deflecting device 11 is mounted in the region of the shaft wall 7. The deflecting device 11 is preferably fastened to a guide rail, particularly the elevator car guide rail 16 or at least supported thereon. Correspondingly, the deflecting device 10 is mounted in the region of the shaft wall 9, wherein the deflecting device 10 is preferably fastened to the elevator car guide rail 17 or at least supported thereon.

After the arrangement and the optionally required fastening of the described elements in the elevator shaft 2 or at the elevator car 13 the introduction of one or more support means 20, 20', 20" is carried out within the scope of the modernization method. The introduction of the support means 20 is described in detail in the following. The introduction of the support means 20', 20" is carried out in corresponding manner. The support means 20, 20', 20" can be made of synthetic material and/or of a metal. In particular, the support means 20, 20', 20" can be constructed as a wire cable or a belt. In the described exemplifying embodiment the support means 20, 20', 20" are belt-shaped or band-shaped.

The support means 20 has a first end 21 and a second end 22. The first end 21 of the support means 20 is fixed in the fastening device 8. The support means 20 is then led downwardly to the counterweight 5 and around the support roller 6 of the counterweight 5. From the counterweight 5 the support means 20 is led back up to the deflecting device 11. In that case, with a belt-shaped support means a rotation of the section of the support means 20 through 90° about its longitudinal axis takes place. The support means 20 is deflected in the deflecting device 11 so that it again runs downwardly to the counterweight 5. The support means 20 is then twisted again through 90°. At the counterweight 5 the support means 20 runs around the support roller 6' of the counterweight 5. The support means 20 subsequently runs upwardly again to an auxiliary roller 4' and back to the drive pulley 4, in which case no twisting of the support means 20 takes place between the support roller 6', the auxiliary roller 4' and the drive pulley 4. The support means 20 runs around the drive pulley 4 and then runs downwardly to the first car support roller 14', in which case the support means 20 is twisted through 180°. The support means 20 then runs substantially horizontally to the second car support roller 15', around the second car support roller 15' and from the second car support roller 15' upwardly again in the region of the shaft wall 9 to the deflecting device 10. In that case the support means 20 is twisted through 90° between the second car support roller 15' and the deflecting device 10. The support means 20 is then deflected by the deflecting device 10 and then runs back down to the second car support roller 15, in which case the support means 20 is twisted through 90°. The support means 20 runs around the second car support roller 15, at least substantially horizontally to the first car support roller 14 and around this first car support roller 14. From the first car support roller 14 the support means 20 runs back up to the fastening device 8, in which case the support means 20 is not twisted. The second end 22 of the support means 20 is then fixed at the fastening device 8.

The vertical position of the elevator car 13 in the elevator shaft 2 can be set by the arrangement of the deflecting devices 10, 11 and/or by the fixing of the ends 21, 22 of the support means 20 in the fastening device 8. In addition, a uniform supporting or suspension of the elevator car 13 is achieved by the supporting of the elevator car 13 by means of the first car support rollers 14, 14', which are arranged parallel to one another, and the second car rollers 15, 15', which are arranged parallel to one another.

Figure 2:
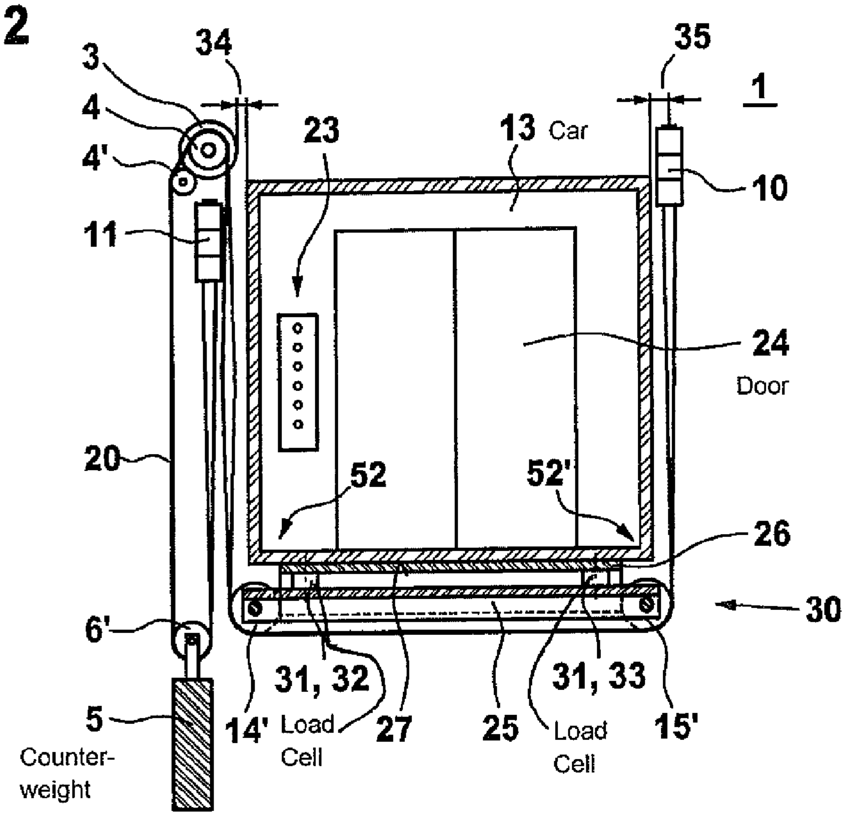
FIG. 2 shows a schematic, vertical section through the modernized elevator installation shown in FIG. 1.
Figure 3:
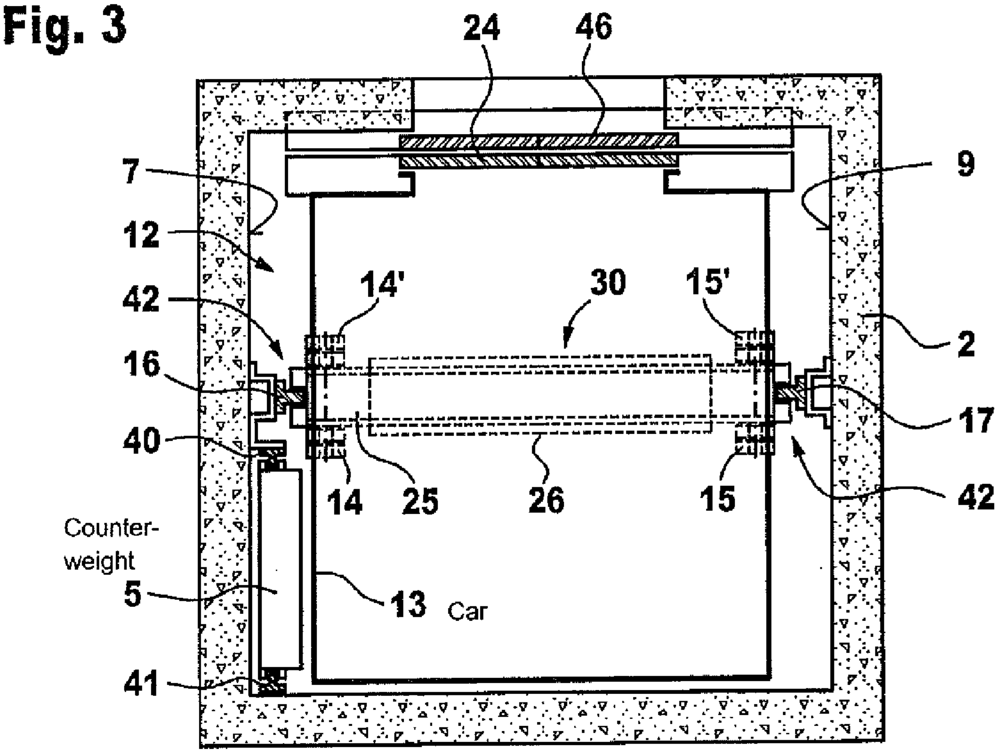
FIG. 3 shows, as a detail and schematically, a horizontal sectional illustration through an elevator shaft of the elevator installation illustrated in FIGS. 1 and 2 together with safety equipment.

FIG. 2 shows a vertical section through the elevator installation 1, which is illustrated in FIG. 1, for further illustration of the modernized elevator installation 1 and of the modernization method for converting the hydraulically actuated elevator installation into the elevator installation 1 driven by the drive machine 3 with the drive pulley 4.

At least the following modernization steps were carried in the course of the modernization method in the case of the elevator installation converted in accordance with FIG. 2:

The original hydraulic cylinder serving as a hydraulic lifter for raising and lowering the elevator car was removed, a counterweight 5 with support rollers 6, 6' as well as the counterweight guide rails 40, 41 guiding the counterweight (FIG. 3) were installed in a free shaft space present between the elevator car 13 and a shaft wall 7 (FIG. 3), a drive machine 3 comprising an electric motor and a drive pulley 4 was mounted in the upper region of the elevator shaft 2 (FIG. 3), wherein the drive machine was preferably arranged within a vertical projection which is bounded by a side wall of the elevator car 13 and the shaft wall 7 adjacent thereto (FIG. 3), the drive machine thus having been able to be installed so that it is supported at least by a guide rail of the elevator car or a newly erected counterweight guide rail, a new drive platform 30, which is supplied as a preassembled unit or in part components, with the required car support rollers was fixed below an underside of the elevator car 13 and support means 20 were installed as described in the preceding in connection with FIG. 1.

By contrast to FIG. 1, the elevator car 13 is illustrated in FIG. 2, wherein the interior of the elevator car 13 is visible by virtue of the sectional illustration. In this regard, a control panel 23 as well as a two-part elevator car door 24 are shown in the interior of the elevator car 13. The control panel 23 can replace the former control panel within the scope of the modernization and be integrated, together with a new control, in the elevator installation 1. In that case, resort can be made to existing parts for actuation of the elevator car door 24 and the like so that a more economic substitution results.

In the exemplifying embodiment according to FIG. 2 the first car support rollers 14' are connected together with the second car support rollers 15' at a fixed mutual spacing by a roller beam 25. In addition, a connecting part 26 on which the elevator car 13 rests by its underside 27 is provided. The roller beam 25 and the connecting part 26 form parts of a drive platform 30 which supports and drives the elevator car 13, wherein the supporting and driving forces are transmitted by way of the support means 20 and the car support rollers 14, 14', 15, 15' to the drive platform 30. The connecting part 26 is flange-mounted on the elevator car 13, wherein the elevator car 13 is guided by the elevator car guide rails 16, 17.

In this exemplifying embodiment the drive platform 30 additionally comprises a load measuring device 31 with load measuring cells 32, 33. The load measuring cells are arranged between the roller beam 25 and the connecting part 26 and issue, for example by utilization of a piezoelectric effect, measurement signals so as to measure the instantaneous loading or load of the elevator car 13.

The auxiliary roller 4' is additionally shown in FIG. 2, by which the support means 20 is led past the deflecting device 11 at a specific safety spacing. Moreover, the drive machine 3 with the drive pulley 4 is arranged at a specific horizontal spacing 34 from the elevator car 13, wherein through setting of the horizontal spacing 34 an arrangement is also made possible in which the elevator car 13 is moved past the drive machine 3 at least partly in vertical direction. Furthermore, a specific horizontal spacing 35 is predetermined between the deflecting device 10 and the elevator car 13 and is set so that the elevator car 13 can be moved past the deflecting device 10.

FIG. 3 shows a schematic horizontal section, in the manner of a detail, through the elevator installation 1 of the first exemplifying embodiment of the invention. In this connection, the elevator car 13 is shown in the space 12 bounded by the elevator shaft 2. The counterweight 5 is also arranged within the space 12 in the case of the modernization method according to the invention. In addition, counterweight guide rails 40, 41 serving for guidance of the counterweight 5 are provided. The drive platform 30 which is arranged below the elevator car and therefore not visible in FIG. 3 is illustrated in dashed lines. As already described in connection with FIG. 2, this comprises a roller beam 25 which is arranged in a connecting part 26 and on which several car support rollers 14, 14', 15, 15' are mounted.

In addition, safety devices 42 which are designed as a safety brake device and/or operating brake device are illustrated. The safety devices 42 co-operate with the elevator car guide rails 16, 17 when the safety device 42 is actuated, for example in the case of detection of excess speed. The safety devices 42 are integrated in suitable manner in the drive platform 30 to be newly installed. Safety-relevant functions are thereby realized in reliable manner in the modernized elevator installation 1.

Moreover, FIG. 3 shows a two-part floor door 46 and a two-part car door 24. The car door and also at least a part of all floor doors are preferably taken over unchanged from the former elevator installation in the modernization method according to the invention.

Figure 4:
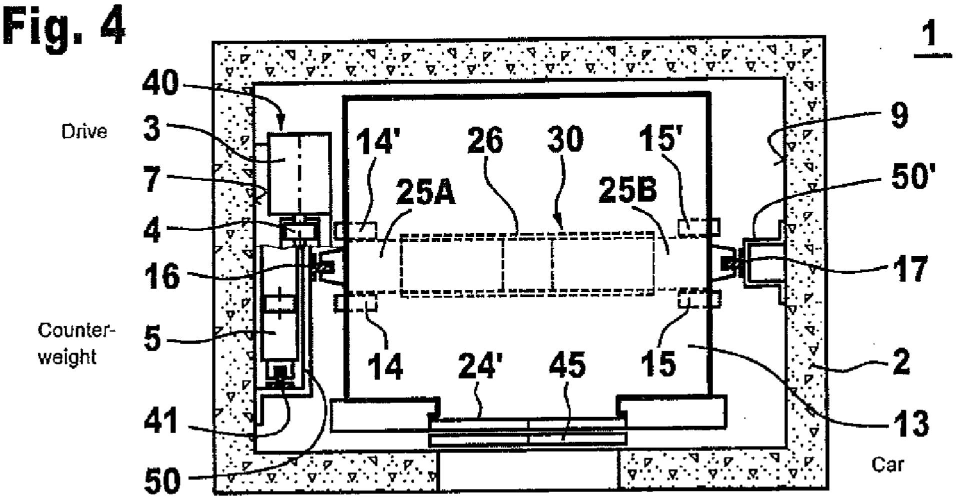
FIG. 4 shows the section, which is shown in FIG. 3, of an elevator installation in correspondence with a second exemplifying embodiment of the invention.

FIG. 4 shows the horizontal section, which is shown in FIG. 3, through an elevator installation in correspondence with a second exemplifying embodiment of the modernization method according to the invention. In this exemplifying embodiment a suitable structure 50 is newly installed, by which a guide rail 16 of the elevator car 13 as well as the guide rails 40, 41 of the counterweight 5 to be newly installed are fixable to the shaft wall 7 adjacent to the elevator car guide rail, wherein the structure 50 is designed so that it makes it possible for this counterweight to travel through the space bounded by the mentioned guide rails and the shaft wall 7. The structure 50 usually consists of a specific number of brackets which are fastened to the shaft wall 7 at specific spacings. The structure 50 is connected with the shaft wall 7 during the modernization and, for example, extends substantially over the entire height of the elevator shaft 2. The drive machine 3 with the drive pulley 4 is mounted in the region of the upper end of the structure 50, wherein the drive machine 3 is preferably supported by the elevator car guide rail 16 and/or by at least one of the counterweight guide rails 40, 41. According the exemplifying embodiment illustrated by way of FIGS. 4 and 5 the drive machine 3 is mounted on an appropriately designed platform which is supported by the elevator car guide rail 16 and the counterweight guide rail 40.

With respect to the illustration of FIG. 4 it is to be noted that two different sections, namely one above the drive machine 3 and one above the counterweight 5, are illustrated in the region of the shaft wall 7. The positions of both the drive machine 3 with the drive pulley 4 and the counterweight 5 can thereby be shown together in FIG. 4. Moreover, illustration of the support means was dispensed with for the purpose of improving clarity.

In the case of the elevator installation 1 shown in FIG. 4 a further structure 50', which is similarly formed from a plurality of brackets respectively connected with the shaft wall 9, is present in the region of the shaft wall 9. The elevator car guide rail 17 is fastened to the structure 50'. Such a structure inclusive of elevator car guide rail is already present and normally reused in the modernization method according to the invention.

In FIG. 4, elements of the drive platform 30, which are covered by the elevator car 13, are additionally illustrated by interrupted lines. In that case the drive platform 30 comprises, in correspondence with the second exemplifying embodiment of the invention, a roller beam 25 which consists of parts 25A, 25B. The parts 25A, 25B of the roller beam 25 are partly pushed into a connecting part 26 connecting them and respectively carry the car support rollers 14, 14' and 15, 15'. The connecting part 26 can, for example, be constructed as a rectangular tube into which parts 25A, 25B, which consist substantially of rectangular tubes with smaller cross-section, are inserted. The parts 25A, 25B are then displaceable and lockable in the connecting part 26 prior to use in the modernization method. Adaptation to different widths of the elevator car 13 is thereby possible, wherein this adaptation can be carried out at the factory or at the time of carrying out the modernization operations in the elevator installation. In the assembled state the parts 25A, 25B are fixed with respect to the connecting part 26, for example by screw connections or by welding. A specific roller spacing between the roller pair of the first car support rollers 14, 14' and the roller pair of the second car support rollers 15, 15' can thus be set. The drive platform 30 is, during performance of the modernization method according to the invention, flange-mounted at the bottom on the elevator car 13 and can include the newly required safety brake device, as is described on the basis of FIG. 3.

Figure 5:
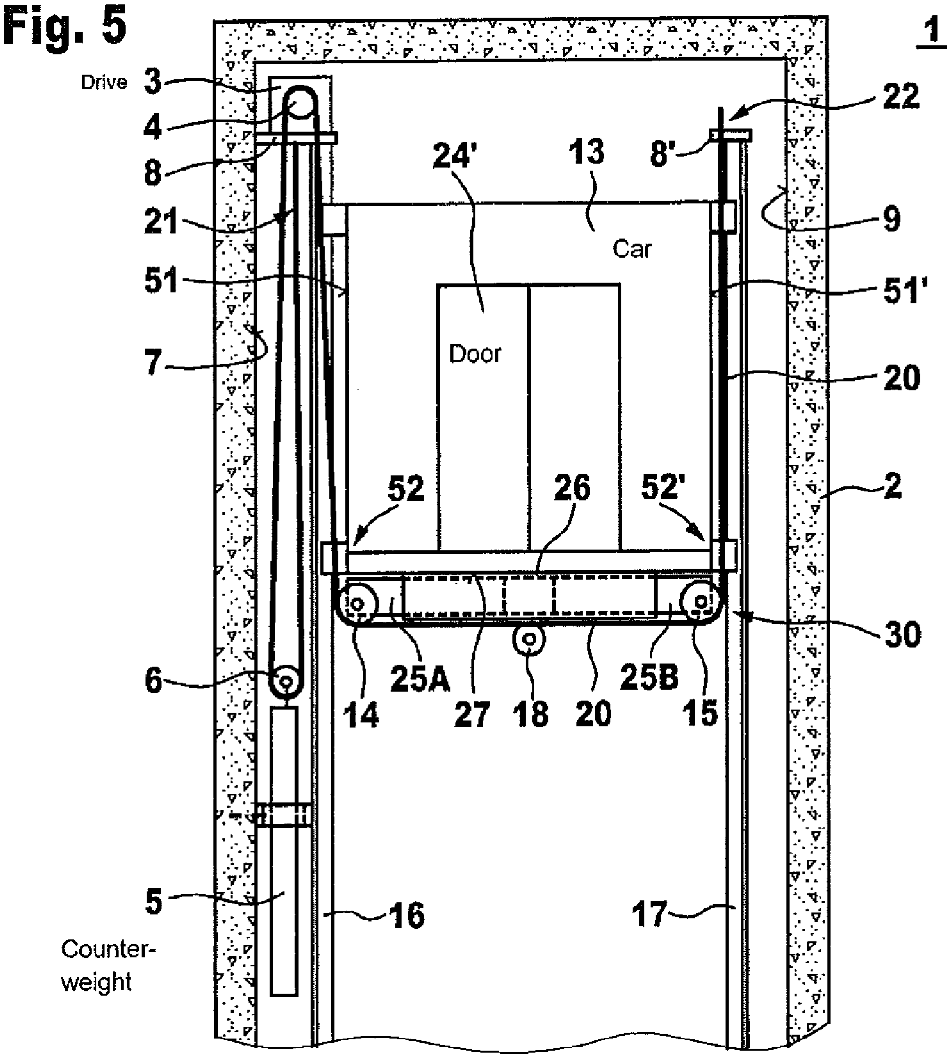
FIG. 5 shows, as a detail, a schematic illustration of an elevator installation in correspondence with the second exemplifying embodiment of the invention.

FIG. 5 shows a front view of the elevator car 13, which is shown in FIG. 4, of the elevator installation 1 in correspondence with the second exemplifying embodiment of the invention. The parts 25A, 25B of the roller beam 25 bear, by means of the connecting part 26, against the underside 27 of the elevator car 13. The parts 25A, 25B are in that case drawn apart to such an extent that the first car support rollers 14, 14' lie at a point 52 of the elevator car 13, which is in the vicinity of the shaft wall 7, and that the second car support rollers 15, 15' lie at a point 52', which is in the vicinity of the shaft wall 9. The points 52, 52' are in that case mutually opposite points at the underside 27 of the elevator car 13. By virtue of the multi-part construction of the roller beam 25 of the drive platform 30 the drive platform can be adapted to elevator cars 13 of different construction. In that case the parts 25A, 25B serving as roller beam can receive as many rollers as the provided number of parallelly arranged support means 20 requires.

The first car support roller 14 is fastened to the part 25A, wherein the first car support roller 14 is so arranged that this lies below the underside 27 of the elevator car and partly above the underside 27 and thus projects beyond the vertical prolongation of the wall 51. The second car support roller 15 is correspondingly arranged at the part 25B with respect to the underside 27 and the wall 51' of the elevator car 13. The guidance of the support means 20 around the car support rollers 14, 15 is illustrated in FIG. 5 by the detail illustration of the support means 20. In that case the support means 20 runs between the car support rollers 14, 15 at least substantially horizontally along the underside 27 of the elevator car 13.

FIGS. 4 and 5 show an elevator installation 1 with a 2:1 support means guidance, i.e. with in each instance a 2:1 suspension for the elevator car and the counterweight. In this embodiment the elevator car 13 comprises in the region of the support means 20, which runs through below the elevator car 13 and is constructed as a wedge-ribbed belt, at least one guide roller 18, which is provided with ribs and grooves, for the wedge-ribbed belt. With the guide roller 18, which is connected with the drive platform 30, the advantageous support means guidance can also be achieved for a wedge-ribbed belt which has ribs and grooves only on its running surfaces, which ribs and grooves are directed outwardly in the region of the car support rollers 14, 14', 15, 15' mounted below the elevator car 13 and thus are not guided by the latter.

Instead of using such a guide roller 18, the wedge-ribbed belt used as support means 20 can be twisted between the drive pulley 4 and the first car support rollers 14, 14' through 180° about its longitudinal axis so that the first car support roller 14—provided with appropriate profiling—can take over guidance of the wedge-ribbed belt.

In the case of the 2:1 support means guidance, which is illustrated in FIG. 5, a further fastening device 8', which is fastened to the elevator car guide rail 17, is provided. The support means 20 is connected on the one hand at a first end 21 to the fastening device 8. The support means 20 is then led downwardly and around the support roller 6 of the counterweight 5. From the support roller 6 the support means 20 is led upwardly again and around the drive pulley 4 of the drive machine 3. The support means 20 is then led downwardly again and around the first car support roller 14. From the first car support roller 14 the support means is led at least substantially horizontally to the second car support roller 15. From the second car support roller 15 the support means 20 is led upwardly, in which case it runs past the wall 51' of the elevator car. The support means 20 is then fastened at its second end 22 in the fastening device 8'.

Insofar as the support means 20 is constructed as a wedge-ribbed belt, either a guide roller 18 is mounted below the support means section extending horizontally under the elevator car or the support means 20 is twisted through 180° about its longitudinal axis between the drive pulley 4 and the car support roller 14.

Figure 6:
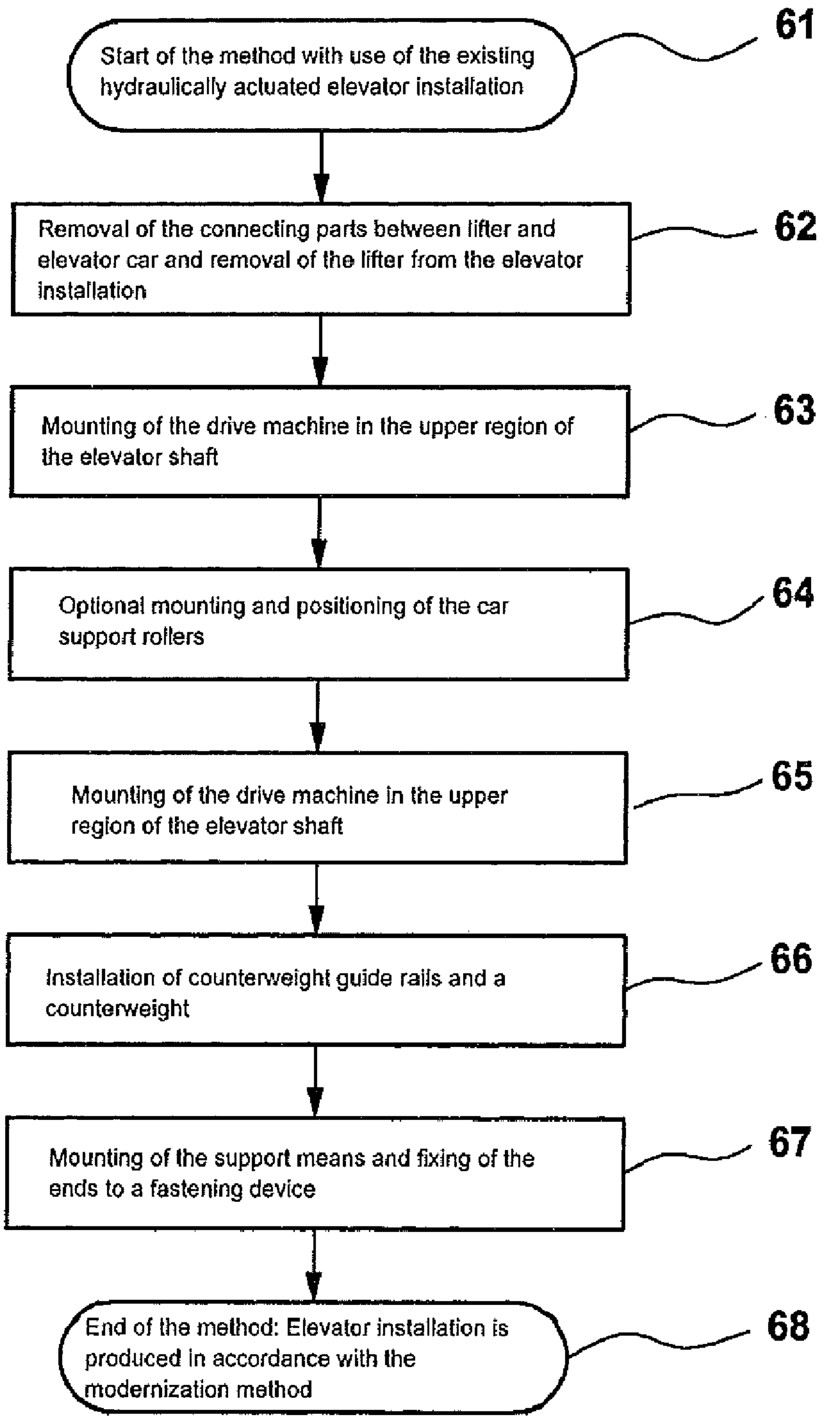
FIG. 6 shows a flow chart for clarification of the modernization method in correspondence with an exemplifying embodiment of the invention.

FIG. 6 shows a flow chart for clarification of the modernization method for converting a hydraulically actuated elevator installation into an elevator installation 1, which is driven by a drive machine 3 with a drive pulley 4, in correspondence with an exemplifying embodiment of the invention. The modernization method is in that case illustrated by way of Steps 61 to 68, with which the following legends are associated:

Step 61: Start of the method with use of the existing hydraulically actuated elevator installation;

Step 62: Removal of the connecting parts between lifter (hydraulic cylinder) and elevator car and removal of the lifter from the elevator installation;

Step 63: Mounting of the drive platform 30 on the underside 27 of the elevator car 13;

Step 64: Optional mounting and positioning of the car support rollers 14, 14', 15, 15';

Step 65: Mounting of the drive machine 3 in the upper region of the elevator shaft 2;

Step 66: Installation of counterweight guide rails 40, 41 and of the counterweight 5;

Step 67: Mounting of the support means 20 and fixing of the ends 21, 22 to a fastening device 8; and Step 68: End of the method: Elevator installation 1 is produced in accordance with the modernization method.

The modernization method for conversion of the hydraulically actuated elevator installation begins in Step 61. The hydraulically actuated elevator installation comprises a hydraulic drive, i.e. a hydraulic lifter with a hydraulic cylinder, which acts by its piston rod on the elevator car 13 directly or by way of a flexible support means and raises and lowers the car. In the following Step 62 the connecting parts between lifter and elevator car 13 and subsequently the lifter itself are removed. The lifter (hydraulic cylinder) inclusive of any hydraulic units which are present are preferably removed from the elevator shaft 2. In that case hydraulic oil or the like is collected and disposed of. In an actual case of use individual parts of the hydraulic drive of the elevator installation can optionally also be left in the elevator shaft 2, even if there is no longer a need for these later.

In Step 63, which follows Step 62, the drive platform 30 is mounted on the underside 27 of the elevator car 13. In that case, distinction can be made between the following forms of construction:

A one-part support construction with the required car support rollers 14, 14', 15, 15' forms the drive platform, which is connected with the underside of the elevator car.

The drive platform comprises a roller beam 25 with the required car support rollers 14, 14', 15, 15', wherein the roller beam is fastened by way of resilient elements and/or by way of a load-measuring device 31 to a connecting part 26 which is connected with the underside of the elevator car.

The drive platform comprises a roller beam 25 consisting of two parts 25A, 25B carrying the required car support rollers, wherein the two roller carrier parts are so mounted in a connecting part 26 that their mutual spacing is settable at least during assembly and wherein the connecting part is connected with the underside of the elevator car.

In all forms of embodiment the car support rollers can, at the time of mounting the drive platform, be already mounted or yet to be mounted.

The drive platform 30 is then reliably connected with the elevator car 13, wherein the elevator car 13 rests by its underside 27 on the drive platform 30.

In the following Step 64 the first car support rollers 14, 14' and the second car support rollers 15, 15' are optionally mounted on the parts 25A, 25B or the roller beam 25 or the drive platform 30, if these have not already been premounted. In that case, a positioning of the car support rollers 14, 14', 15, 15' with respect to the underside 27 as well as the wall 51 or the wall 51' can optionally also be carried out, so that the car support rollers 14, 14', 15, 15' are arranged at the points 52, 52' and each partly project beyond the underside 27.

In Step 65 the drive machine 3 with the drive pulley 4 and the optionally provided auxiliary roller 4' is mounted in the upper region of the elevator shaft 2. In that case it is possible to provide, for example, a platform which is fastened to at least one of the guide rails 16, 40 or supported thereon. In addition, the platform can also be fastened to a structure 50 as is illustrated in FIG. 4.

In Step 66 a counterweight 5 is introduced into the elevator shaft 2 and installed in the region of the shaft wall 7 at which the drive machine 3 with the drive pulley 4 is also arranged. In this regard, additional counterweight guide rails 40, 41 are fastened in the elevator shaft 2, for example to a structure 50 such as is illustrated in FIG. 4. The installed counterweight 5 is then guided in the elevator shaft 2 by the counterweight guide rails 40, 41. One or more support rollers 6, 6' are mounted on the counterweight 5.

The support means 20, preferably a belt or a wedge-ribbed belt, is mounted in Step 67. In that case, several support means 20, 20', 20" can also be provided. One possibility for mounting the support means is described on the basis of FIG. 1 in further detail. The mounting of the support means 20 can also be carried in the reverse direction.

The method ends at Step 68, in which the elevator installation is converted into an elevator installation 1 driven by a drive pulley.

It is to be noted that the sequence of the described Steps 62 to 67 is to be understood as an example and the modernization method can also be carried out in a different sequence. In addition, individual steps can optionally also be carried out with overlap or simultaneously.

The invention is not restricted to the described exemplifying embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A modernization method for conversion of an existing hydraulically actuated elevator installation into a modernized elevator installation driven by a drive machine with a drive pulley, comprising the steps of:

demounting a hydraulic cylinder of the hydraulically actuated elevator installation;

installing a drive machine with a drive pulley in the modernized elevator installation;

installing a counterweight guide and a counterweight in the modernized elevator installation;

mounting a drive platform at an elevator car of the hydraulically actuated elevator installation substantially below an underside of the elevator car, wherein the drive platform has a first car support roller and a second car support roller;

installing a support means so that the support means loops partly around the drive pulley, a support roller of the counterweight and the car support rollers, supports the elevator car by the car support rollers and is drivable by the drive pulley of the drive machine for movement of the elevator car; and wherein the drive platform is of multi-part construction, wherein a first part of the drive platform carries the first car support roller, which is arranged on one side of the elevator car, and a second part of the drive platform carries the second car support roller, which is arranged on an opposite side of the elevator car, and wherein a spacing between the first part and the second part and thus between the first car support roller and the second car support roller is set at a time of manufacture or during the performance of the steps of the modernization method.

2. The modernization method according to claim 1 wherein the car support rollers are arranged in a region of mutually opposite points of the underside of the elevator car to protrude laterally partly beyond the underside of the elevator car.

3. The modernization method according to claim 1 including mounting at least one fastening device for fixing a first end of the support means in a region of an elevator shaft of the hydraulically actuated elevator installation, wherein the fastening device is mounted at at least one of an elevator car guide rail serving for guidance of the elevator car in the elevator shaft and a counterweight guide rail serving for guidance of the counterweight in the elevator shaft.

4. The modernization method according to claim 3 wherein the support means is led around the support roller, which is arranged below the fixed first end of the support means, of the counterweight, subsequently around the drive pulley, which is arranged above the support roller of the counterweight, of the drive machine and from the drive pulley downwardly to the first car support roller and then horizontally to the second car support roller.

5. The modernization method according to claim 3 including arranging a deflecting device which downwardly deflects the support means leading upwardly from the second car support roller in a region of a shaft wall of the elevator shaft lying in a vicinity of the second car support roller, after which the support means loops under the second car support roller and the first car support roller and is subsequently led back to the fastening device, where a second end of the support means is fixed by the fastening device.

6. The modernization method according to claim 5 including mounting the deflecting device at at least one the elevator car guide rail and the counterweight guide rail.

7. The modernization method according to claim 1 including connecting the car support rollers with the elevator car by the drive platform.

8. The modernization method according to claim 1 wherein the drive platform comprises at least one connecting part and the first part of the drive platform is connected with the second part of the drive platform by the connecting part.

9. The modernization method according to claim 8 wherein the first and second parts are displaceable in the connecting part and including fixing the first and second parts relative to one another during assembly of the modernized elevator installation.

10. The modernization method according to claim 1 including connecting the drive platform with the underside of the elevator car.

11. The modernization method according to claim 10 wherein the drive platform comprises a load measuring device, wherein the load measuring device is mounted so that the elevator car is supported on the car support rollers by the load measuring device.

12. The modernization method according to claim 1 wherein the drive platform comprises a safety device formed as at least one of a safety brake device and an operating brake device, wherein the safety device is arranged to co-operate with at least one of an elevator car guide rail and a counterweight guide rail.

13. The modernization method according to claim 1 wherein the support means is formed as a wedge-ribbed belt and is guided in at least one of the car support rollers, the drive pulley and the counterweight support roller, which has guide grooves.

14. A modernization method for conversion of an existing hydraulically actuated elevator installation having an elevator car in an elevator shaft into a modernized elevator installation driven by a drive machine with a drive pulley, comprising the steps of:

demounting a hydraulic cylinder of the hydraulically actuated elevator installation;

installing a drive machine with a drive pulley in the elevator shaft;

installing a counterweight guide and a counterweight in the elevator shaft;

mounting a drive platform at the elevator car substantially below an underside of the elevator car, wherein the drive platform has a first car support roller and a second car support roller;

installing a support means so that the support means loops partly around the drive pulley, a support roller of the counterweight and the car support rollers, supports the elevator car by the car support rollers and is drivable by the drive pulley of the drive machine for movement of the elevator car; and wherein the drive platform is of multi-part construction, wherein a first part of the drive platform carries the first car support roller, which is arranged on one side of the elevator car, and a second part of the drive platform carries the second car support roller, which is arranged on an opposite side of the elevator car, and wherein a spacing between the first part and the second part and thus between the first car support roller and the second car support roller is set at a time of manufacture or during the performance of the steps of the modernization method to arrange the car support rollers in a region of mutually opposite points of the underside of the elevator car to protrude laterally partly beyond the underside of the elevator car.

15. The modernization method according to claim 14 including mounting at least one fastening device for fixing a first end of the support means in a region of the elevator shaft, wherein the fastening device is mounted at at least one of an elevator car guide rail serving for guidance of the elevator car in the elevator shaft and a counterweight guide rail serving for guidance of the counterweight in the elevator shaft.

16. The modernization method according to claim 15 wherein the support means is led around the support roller, which is arranged below the fixed first end of the support means, of the counterweight, subsequently around the drive pulley, which is arranged above the support roller of the counterweight, of the drive machine and from the drive pulley downwardly to the first car support roller and then horizontally to the second car support roller.

17. The modernization method according to claim 15 including arranging a deflecting device which downwardly deflects the support means leading upwardly from the second car support roller in a region of a shaft wall of the elevator shaft lying in a vicinity of the second car support roller, after which the support means loops under the second car support roller and the first car support roller and is subsequently led back to the fastening device, where a second end of the support means is fixed by the fastening device.

18. The modernization method according to claim 17 including mounting the deflecting device at at least one the elevator car guide rail and the counterweight guide rail.

19. The modernization method according to claim 14 including connecting the drive platform with the underside of the elevator car and wherein the drive platform comprises a load measuring device, wherein the load measuring device is mounted so that the elevator car is supported on the car support rollers by the load measuring device.

* * * * *